(12) United States Patent
Zhang et al.

(10) Patent No.: US 7,940,024 B2
(45) Date of Patent: May 10, 2011

(54) MEDIA PORTAL FOR VEHICLE

(75) Inventors: Jing Zhang, Grosse Pointe Park, MI (US); Jocelyn J Lau, Bloomfield Hills, MI (US); Michael H Thomas, Royal Oak, MI (US); Russell Lewis Ernest Blanchard, New York, NY (US); Marko Macura, Eindhoven (NL)

(73) Assignee: GM Global Technology Operations LLC, Detroit, MI (US)

( * ) Notice: Subject to any disclaimer, the term of this patent is extended or adjusted under 35 U.S.C. 154(b) by 505 days.

(21) Appl. No.: 12/142,259

(22) Filed: Jun. 19, 2008

(65) Prior Publication Data

US 2009/0021211 A1    Jan. 22, 2009

Related U.S. Application Data

(60) Provisional application No. 60/950,477, filed on Jul. 18, 2007.

(51) Int. Cl.
*H02J 7/00* (2006.01)
*G08B 1/08* (2006.01)

(52) U.S. Cl. .................................. 320/108; 340/539.11
(58) Field of Classification Search .................. 320/108; 340/539.11
See application file for complete search history.

(56) References Cited

U.S. PATENT DOCUMENTS

| 6,489,745 | B1 | 12/2002 | Koreis |
| 6,906,495 | B2 | 6/2005 | Cheng et al. |
| 7,167,680 | B2 | 1/2007 | Haller et al. |
| 7,170,400 | B2 * | 1/2007 | Cowelchuk et al. ........... 340/438 |
| 7,313,467 | B2 * | 12/2007 | Breed et al. ........................ 701/1 |
| 2004/0056779 | A1 * | 3/2004 | Rast ............................... 340/985 |
| 2005/0007067 | A1 * | 1/2005 | Baarman et al. |
| 2005/0127866 | A1 * | 6/2005 | Alistair et al. |
| 2006/0043927 | A1 | 3/2006 | Beart et al. |
| 2008/0092200 | A1 | 4/2008 | Grady et al. |

FOREIGN PATENT DOCUMENTS

| EP | 1780863 A2 | 5/2007 |
| JP | 2003008703 A * | 1/2003 |

* cited by examiner

*Primary Examiner* — Bot LeDynh
*Assistant Examiner* — M'Baye Diao
(74) *Attorney, Agent, or Firm* — Quinn Law Group, PLLC

(57) ABSTRACT

A media portal for a vehicle includes a structure within a vehicle passenger compartment that defines a cavity. The cavity is selectively variable in size in order to retain a portable electronic device. A sensor is configured to detect the presence of the portable electronic device in the cavity. An inductive charger is positioned to generate a changing magnetic field in the cavity to inductively charge a battery of the portable electronic device. At least one user interface device is included through which data can be received from or transmitted to the portable electronic device.

19 Claims, 4 Drawing Sheets

US 7,940,024 B2

MEDIA PORTAL FOR VEHICLE

CROSS-REFERENCE TO RELATED APPLICATIONS

This application claims the benefit of U.S. Provisional Application No. 60/950,477, filed Jul. 18, 2007, which is hereby incorporated by reference in its entirety.

TECHNICAL FIELD

The present invention relates generally to a media portal for automobiles and more specifically to a media portal for charging an electronic device.

BACKGROUND OF THE INVENTION

Due to the widespread use of portable electronic devices, vehicles often include DC output portals which are used to charge electronic devices when a passenger is in the vehicle. Many vehicles contain these portals as they were commonly used as a lighter source in the past.

However, adapters are required to connect the electronic devices to the DC output portals and carry an electronic charge from the DC output portal to the battery of the electronic device. Because of the variety of inputs used on the electronic devices the adapters are specific to the type of electronic device they are used with. The use of adaptors for charging electronic devices within vehicles has become more common. The required adapters may typically be purchased from the same retail source as the electronic device. These adapters are configured to plug into the vehicle's DC output portal. However, a vehicle user must purchase separate adapters for each of the electronic devices they desire to use within the vehicle.

SUMMARY OF THE INVENTION

A media portal for a vehicle which provides an arrangement for charging various electronic devices is desired.

A vehicle includes a vehicle body that defines a passenger compartment. Within the passenger compartment is a structure that defines a cavity. The cavity is selectively variable in size to retain a portable electronic device.

A media portal within the vehicle includes a sensor configured to detect the presence of the portable electronic device in the passenger compartment. An indicating source, such as a light source may be configured to emit light in response to the sensor detecting the presence of the portable electronic device. An inductive charger may be positioned to generate a changing magnetic field in the cavity. The changing magnetic field will inductively charge a battery of the portable electronic device when the portable electronic device is at least partially located within the cavity.

Further, wireless connectivity hardware may be configured to establish a wireless connection with the portable electronic device in the cavity. There may be at least one user interface device provided through which data can be received from or transmitted to the portable electronic device via the wireless connectivity hardware.

The above features and advantages, and other features and advantages of the present invention will be readily apparent from the following detailed description of the preferred embodiments and best modes for carrying out the present invention when taken in connection with the accompanying drawings.

DESCRIPTION OF THE PREFERRED EMBODIMENTS

Figure 1:
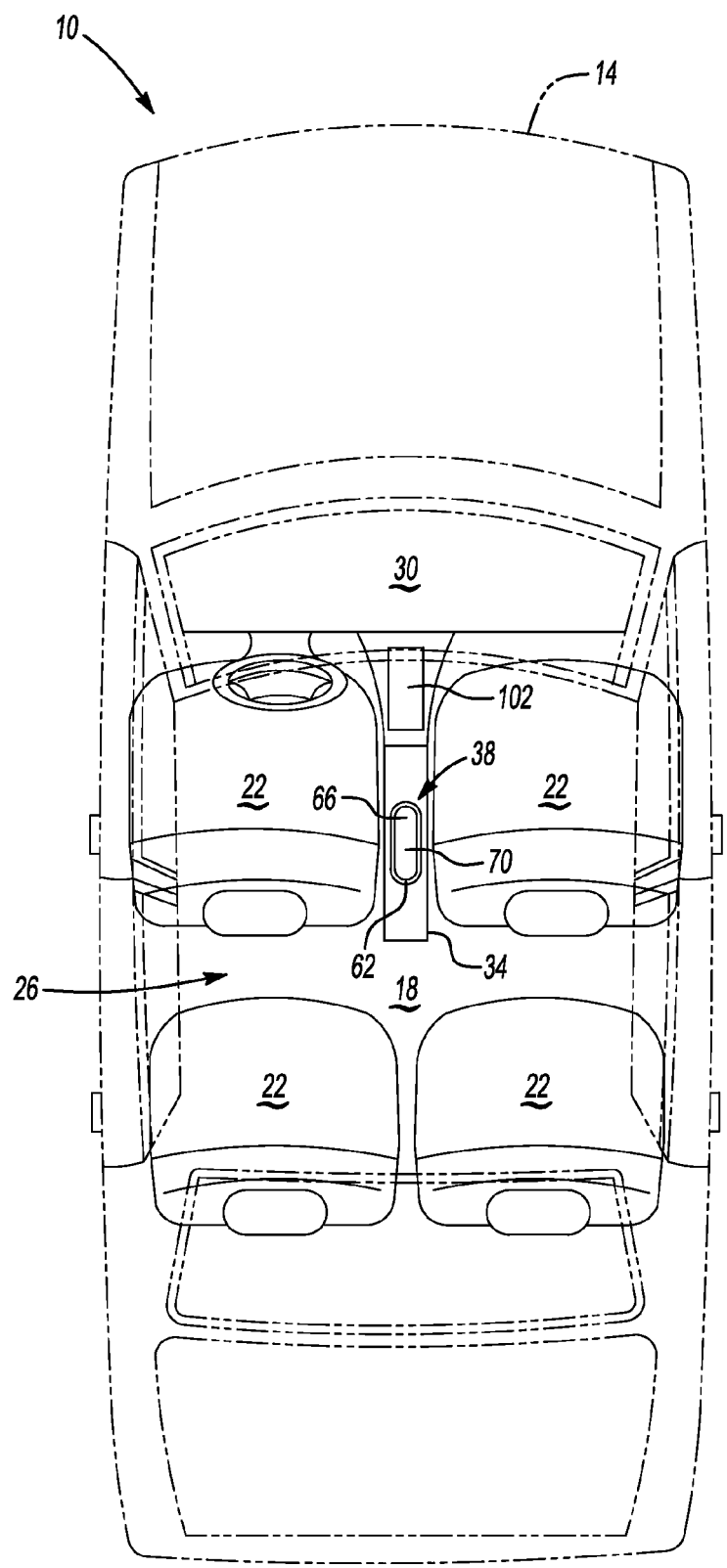
FIG. 1 is a schematic illustration of a top view of a vehicle with vehicle passenger compartment having a media portal.

Referring to FIG. 1, a vehicle 10 includes a vehicle body 14. The vehicle body 14 at least partially defines a passenger compartment 18. The vehicle 10 includes multiple passenger seats 22 that are mounted with respect to a floor 26 of the vehicle body 14 and are disposed within the passenger compartment 18. An instrument panel 30 is mounted with respect to the vehicle body 14 and is disposed at the forward end of the passenger compartment 18. Additionally, a center console 34 is mounted with respect to the vehicle body 14 and is disposed within the passenger compartment 18. The center console 34 is preferably adjacent to the instrument panel 30 and extends between a front two of the multiple passenger seats 22.

Figure 2:
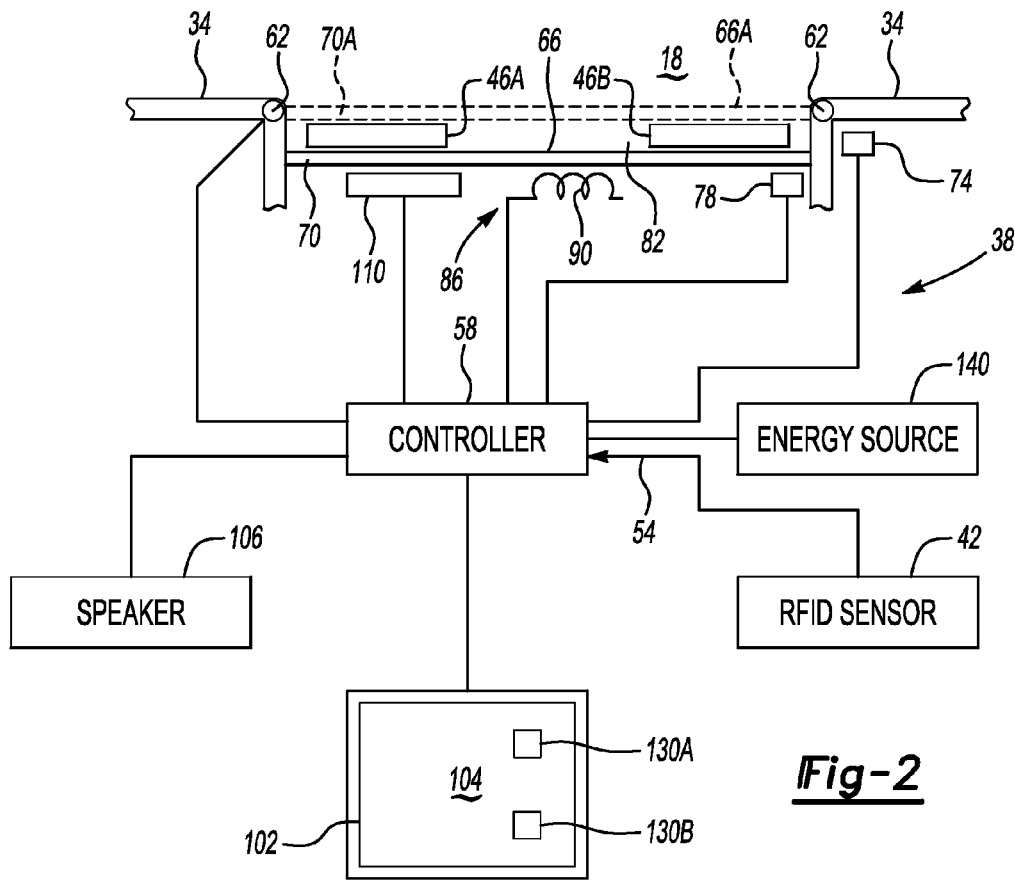
FIG. 2 is a schematic illustration of a fragmentary side view of the media portal of FIG. 1.

The vehicle 10 also includes a media portal 38. Referring to FIGS. 1 and 2, the media portal 38 includes a radio frequency identification (RFID) sensor 42. The RFID sensor 42 is configured to detect a presence within the passenger compartment 18 of any one or more portable electronic devices 46A, 46B compatible with the media portal 38. More specifically, the RFID sensor 42 is configured to transmit a first radio frequency signal. The first radio frequency signal is configured to detect the presence of a corresponding RFID tag located in the portable electronic devices 46A, 46B. Other types of sensors including short range wireless sensors, contract switches or the like may be used to detect the presence of one or more portable electronic devices 46A, 46B.

Figure 3:
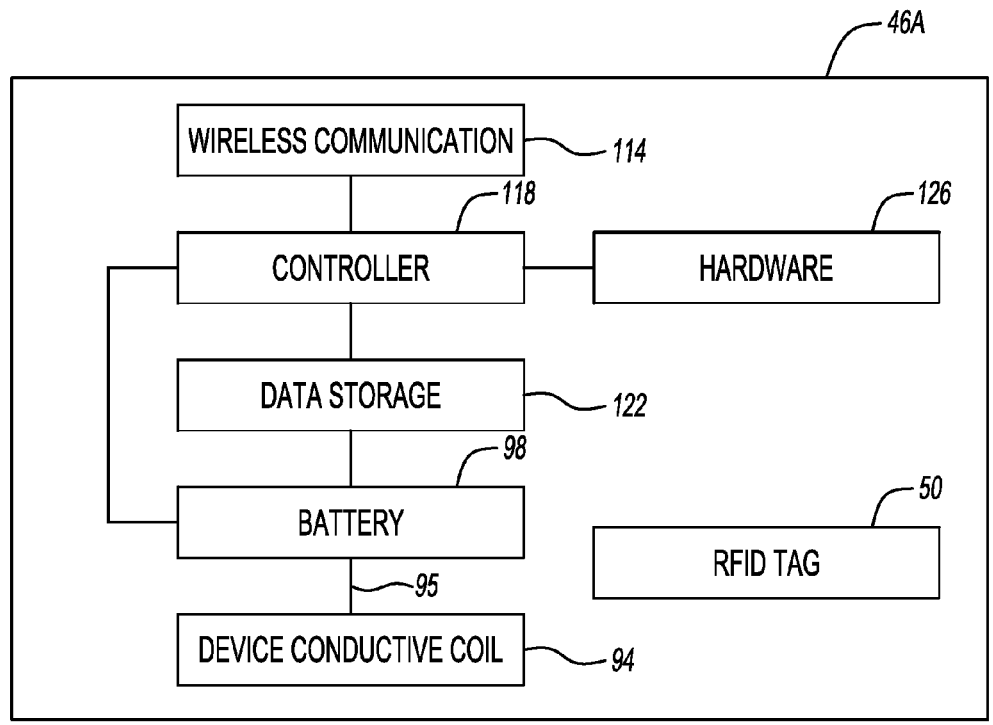
FIG. 3 is a schematic illustration of an electronic device for use with the media portal of FIGS. 1 and 2.

Referring to FIG. 3, the portable electronic device 46A includes an RFID tag 50. The RFID tag 50 is configured to transmit a second radio frequency signal in response to receiving the first radio frequency signal from the RFID sensor 42, as understood by those skilled in the art. The portable electronic device 46B also includes an RFID tag (not shown) similar to RFID tag 50 of electronic device 46A.

Referring again to FIGS. 1 and 2, receipt of the second radio frequency signal by the RFID sensor 42 indicates that a compatible electronic device 46A is within the passenger compartment 18. The RFID sensor 42 then transmits a signal 54 to a controller 58 indicating the presence of a compatible electronic device 46A. The controller 58 is operatively connected to a light source 62 and is configured to selectively cause the light source 62 to emit light into the passenger compartment 18. In the embodiment depicted, the light source 62 is an acrylic light pipe configured to emit light from one or more full color or red, green, blue (RGB) light emitting diodes. The light source 62 surrounds a surface 66 on the center console 34.

In response to receipt of the signal 54, the controller 58 causes the light source 62 to emit light into the passenger compartment 18 to indicate to the occupant of the passenger compartment 18 that the occupant's portable electronic device 46A is compatible with the media portal 38. In an exemplary embodiment, the light source 62 produces "animated" light of varying colors.

The surface 66 on the center console 34 is defined by a member 70, and is preferably rubberized or provides a high friction surface to reduce movement of the one or more electronic devices 46A, 46B on the surface 66. In addition to the RFID sensor 42, the media portal 38 also includes a presence sensor 74 configured to detect the presence of one or more electronic devices 46A, 46B on the surface 66, and to communicate the presence or absence of the one or more portable electronic devices 46A, 46B on the surface 66 to the controller 58. If the presence of the one or more of the portable electronic devices 46A, 46B is detected the controller 58 is configured to cause an actuator 78 to move the member 70 from an elevated position (as shown in FIG. 1 and in phantom at 70A in FIG. 2) to a depressed position as shown at 70 in FIG. 2. Correspondingly, the surface 66 is moved from an elevated position (shown in phantom at 66A in FIG. 2) to a depressed position (shown at 66 in FIG. 2). When the member 70 is in the depressed position, the surface 66 cooperates with the surrounding structure of the console 34 to define a cavity 82 to at least partially contain the electronic devices 46A, 46B. When the member 70 is in the elevated position, the surface 66 is positioned such that the volume and depth of the cavity 82 is smaller (or nonexistent) than when the member 70 is in the depressed position.

The controller 58 is also configured to activate an inductive charging system 86 that charges a battery 98 of the portable electronic device 46A when the portable electronic device 46A is on the surface 66. More specifically, in the embodiment depicted, the inductive charging system 86 is configured to generate a changing magnetic field utilizing a vehicle conductive coil 90, as understood by those skilled in the art.

Referring to FIGS. 2 and 3, the changing magnetic field created by the vehicle conductive coil 90 correspondingly causes a current in a device conductive coil 94. The device conductive coil 94 is operatively connected through circuitry 95 to the battery 98 of the electronic device 46A to provide an electric charge to the battery 98. The electronic device 46B also includes a device conductive coil (not shown) and a battery (not shown) similar to the device conductive coil 94 and the battery 98 of the portable electronic device 46A. The portable electronic device 46B is charged in the same manner as the portable electronic device 46A. When multiple portable electronic devices 46A, 46B are located at least partially in the cavity 82 the magnetic field, created by the vehicle conductive coil 90, will provide an electric charge to each of them simultaneously.

The media portal 38 also includes input and/or output devices that each function as a user interface between the occupant of the passenger compartment 18 and the portable electronic devices 46A, 46B. In the embodiment depicted, the medial portal 38 includes a display 102, such as a liquid crystal display. The display 102 is operatively connected to the controller 58. The display 102 may be included in the instrument panel 30 (shown in FIG. 1) of the vehicle 10. The display 102 functions as an output device. That is, the controller 58 controls the information displayed on a screen 104 of the display 102 to convey information to the occupant of the passenger compartment 18. The display 102 may also function as an input device. That is, the screen 104 of the display 102 is a touch-screen, i.e., the occupant can input information to the electronic devices 46A, 46B by touching the screen 104 of the display 102, as understood by those skilled in the art. Additionally, the media portal 38 includes at least one speaker 106 operatively connected to the controller 58 to allow output of sound from the electronic devices 46A, 46B to the occupant of the passenger compartment 18.

The media portal 38 also includes wireless connectivity hardware 110 operatively connected to the controller 58. Referring again to FIG. 3, the portable electronic device 46A includes corresponding device wireless connectivity hardware 114. The electronic device 46A also includes a device controller 118, a data storage medium 122 (such as magnetic recording media, electrically erasable programmable Read-Only Memory, etc.), and hardware components 126. The device controller 118 is operatively connected to the data storage medium 122 to retrieve data therefrom and to store data therein. The device controller 118 is operatively connected to the hardware components 126 to control the hardware components 126. The battery 98 is provided to supply electrical energy to the various hardware components 126 of the portable electronic device 46A. Similarly, the electronic device 46B has device wireless connectivity hardware, a device controller, hardware components, and data storage medium similar to that of the electronic device 46A.

The media portal 38 and the electronic devices 46A, 46B are configured to establish wireless connectivity such that the occupant of the passenger compartment 18 can receive information from, and transmit information to, the portable electronic devices 46A, 46B on the surface 66, through the wireless connectivity hardware 110 and the device wireless connectivity hardware 114 and the user interface devices, such as the display 102 and the at least one speaker 106.

In response to the RFID sensor 42 detecting the presence of a portable electronic device 46A, 46B, or in response to the presence sensor 74 detecting the portable electronic devices 46A, 46B in the cavity 82, the controller 58 attempts to establish connectivity with the device controller 118 via the wireless connectivity hardware 110 and the device wireless connectivity hardware 114. Those skilled in the art will recognize a variety of wireless connectivity protocols that may be employed within the scope of the claimed invention. Once connectivity is established, the controller 58 causes the display 102 to show a respective icon 130A, 130B for each of the portable electronic devices 46A, 46B with which the controller 58 has established a functioning wireless connection. The controller 58 may also be connected to an energy source 140 for operation of the media portal 38 when the vehicle 10 is not operating.

The occupant of the passenger compartment 18 can interact with one of the electronic devices 46A, 46B by touching the screen of the display 102 at the icon 130A, 130B corresponding to the desired portable electronic devices 46A, 46B. Preferably, the major controls and functions of the portable electronic devices 46A, 46B are accessible to the occupant through the media portal 38. For example, if portable electronic device 46A is an MP3 player, then the occupant can select, using the display 102, music files stored in data storage medium 122 to be played through that at least one speaker 106. Similarly, if the portable electronic device 46B is a cellular telephone, then the occupant can access the telephone numbers and other information stored in the data storage medium (not shown) of the portable electronic device 46B, and can command the cellular telephone to call one of the numbers. The media portal 38 may also include a microphone (not shown) operatively connected to the wireless connectivity hardware 110 so that the occupant can transmit voice signals to the portable electronic device 46B via the connectivity hardware 110, such as voice activated calling. The portable electronic device 46B may also transmit signals back to the speakers 106 via the device wireless connectivity hardware 114. For example, the wirelessly transmitted signals may provide "hands free" calling with the portable electronic device 46B.

Figure 4:
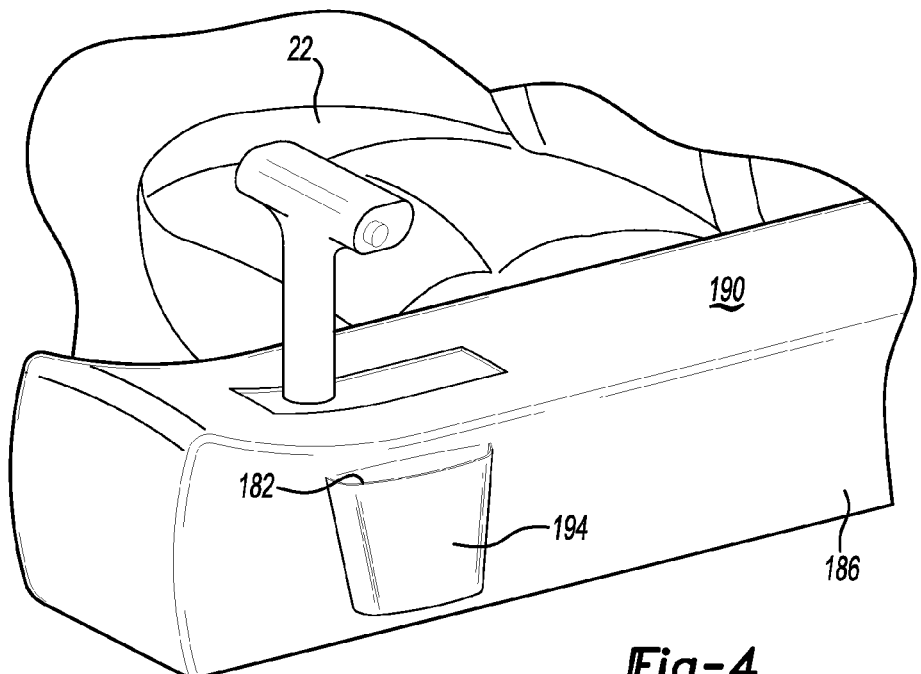
FIG. 4 is a schematic illustration of a fragmentary perspective view of a vehicle passenger compartment having another embodiment of a media portal.

Referring to FIG. 4, an alternative cavity 182 to receive and retain the portable electronic devices 46A, 46B is schematically depicted. The cavity 182 is defined between a sidewall 186 of a center console 190 and by a member 194, which is mounted to the sidewall 186. The cavity 182 is upwardly open to receive that one or more portable electronic devices 46A, 46B. That is, the portable electronic devices 46A, 46B may be inserted through the opening at the top of the cavity 182.

Referring to FIGS. 5A-D, wherein like reference numbers refer to like components from FIG. 4, the member 194 is configured to alter its shape upon an activation signal (such as from controller 58 as previously described). For example, the member 194 includes a mechanical device to move the location of member 194 relative to the sidewall 186 of the center console 190 upon receipt of the activation signal. Additionally, member 194 may be an active material. Those skilled in the art will recognize a variety of active materials that may be employed within the scope of the claimed invention, including, for example, shape memory alloys, shape memory polymers, etc.

Figure 5A:
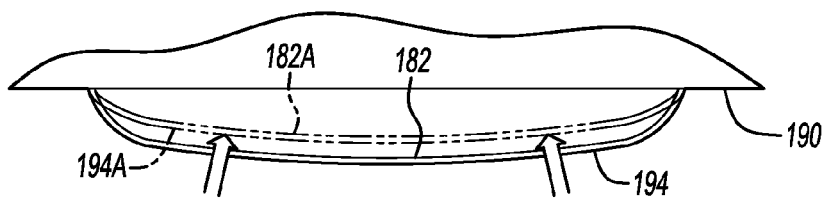
FIG. 5A is a schematic illustration of a fragmentary top view of the media portal of FIG. 4.
Figure 5B:
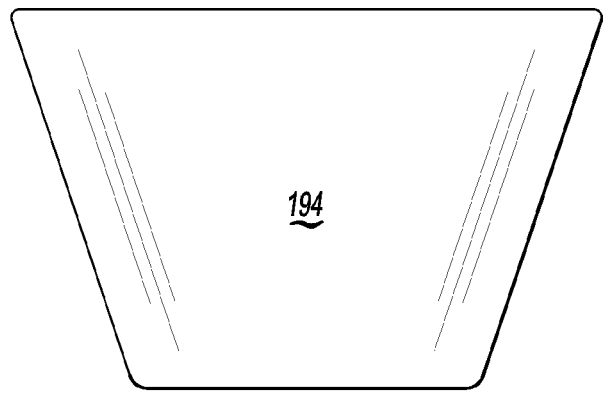
FIG. 5B is a schematic illustration of a fragmentary side view of the media portal of FIGS. 4 and 5A.
Figure 5C:
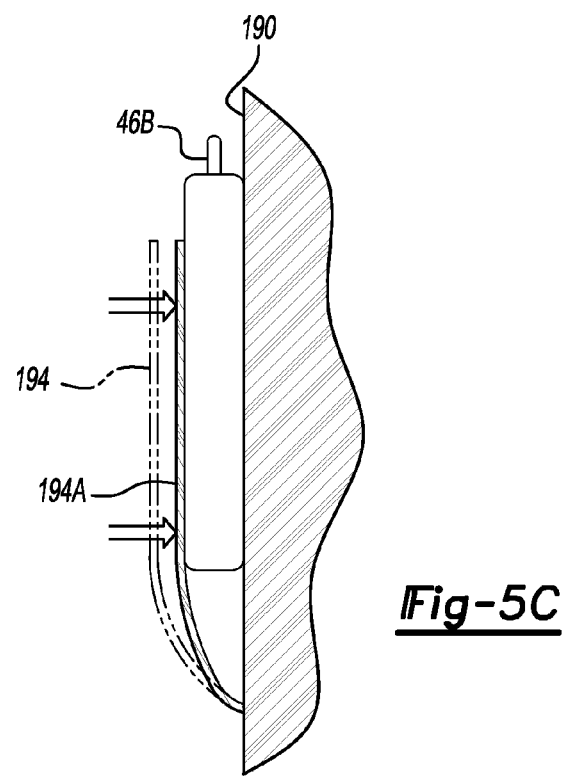
FIG. 5C is a schematic illustration of a fragmentary side view of the media portal of FIGS. 4-5B connected with a console having an electronic device located within the media portal.
Figure 5D:
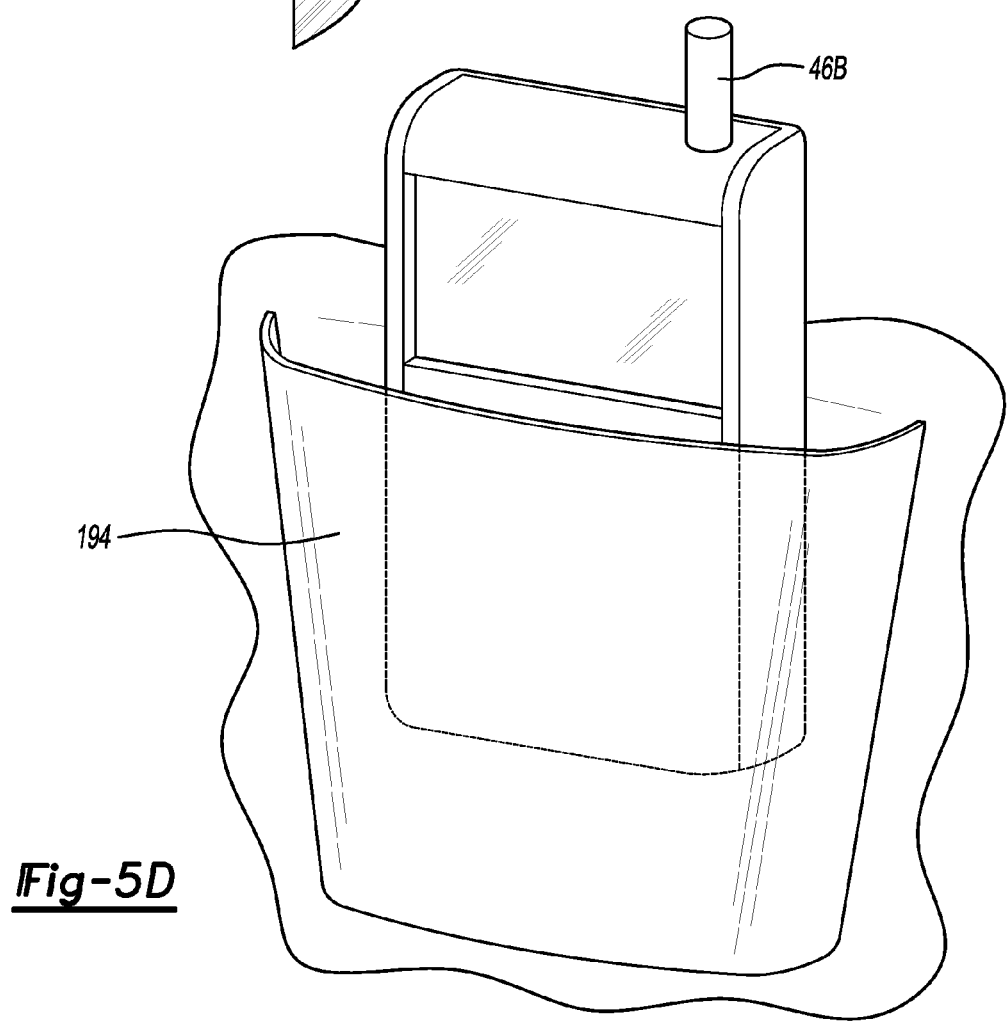
FIG. 5D is a schematic illustration of a perspective view of the media portal of FIGS. 4-5C having an electronic device located within the media portal.

As shown in FIG. 5A, the member 194 is characterized by a first shape in the absence of the activation signal and a second shape (shown in phantom at 194A) in the presence of the activation signal. When the member is in its second shape, the cavity (shown in phantom at 182A) is narrower than when the member 194 is in its first shape so that the member 194A and the sidewall 186 of the center console 190 each contact the portable electronic device 46B when the portable electronic device 46B is placed within the cavity 182. The contact of the sidewall 186 of the center console 190 and the member 194A with the portable electronic device 46B thereby prevents movement of the portable electronic device 46B. The controller 58 (shown in FIG. 2) is configured to provide the activation signal in response to a sensor (not shown but similar to that of presence sensor 74, above) detecting the presence of the portable electronic device 46B in the cavity 182.

The above embodiments describe the media portal 38 associated with a horizontal or vertical surface of a center console 34, 190. However, the media portal 38 may be located on another horizontal or vertical surface within the passenger compartment 18 that is accessible to the vehicle operator and/or a vehicle passenger. The media portal 38 would then operate in a similar manner as described herein. Those skilled in the art would recognize appropriate locations for the position of the media portal 38.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
 a vehicle body defining a passenger compartment;
 structure that defines a cavity in the passenger compartment, wherein the cavity is selectively variable in size to retain a portable electronic device;
 a sensor configured to detect the presence of the portable electronic device in the passenger compartment;
 an indicator source configured to generate a signal in response to the sensor detecting the presence of the portable electronic device;
 an inductive charger, wherein the inductive charger is sufficiently positioned to generate a changing magnetic field in the cavity to inductively charge a battery of the portable electronic device, when the portable electronic device is at least partially within the cavity;
 wireless connectivity hardware configured to establish wireless connectivity with the portable electronic device in the cavity; and
 at least one user interface device through which data can be received from or transmitted to the portable electronic device via the wireless connectivity hardware.

2. The vehicle of claim 1, wherein the structure that defines the cavity includes a member comprising an active material.

3. The vehicle of claim 2, wherein the active material comprises one of a shape memory alloy and a shape memory polymer.

4. The vehicle of claim 1, wherein the cavity is a first size in the absence of an activation signal and the cavity is a second size in the presence of an activation signal.

5. The vehicle of claim 4, wherein the structure comprises a member with a surface configured to support the portable electronic device, wherein the surface is in an elevated position in the absence of the activation signal and the surface is in a depressed position in the presence of the activation signal.

6. The vehicle of claim 5, wherein the structure that defines the cavity further comprises a console when the member is in the depressed position.

7. The vehicle of claim 4, wherein the structure comprises a member and a wall of a console, wherein the member is connected with the wall, wherein the member is in an extended position with respect to the wall in the absence of the activation signal and the member is in a contracted position with respect to the wall in the presence of the activation signal.

8. The vehicle of claim 1, wherein the sensor is a radio frequency identification sensor.

9. The vehicle of claim 1, further comprising a second sensor to detect the presence of the portable electronic device at least partially within the cavity.

10. A media portal for use with a portable device comprising:
 structure that defines a cavity, wherein the cavity is selectively variable in size to retain the portable electronic device;
 a sensor configured to detect the presence of the portable electronic device proximate to the structure;
 an indicator configured to generate a signal in response to the sensor detecting the presence of the portable electronic device;
 an inductive charger, wherein the inductive charger is sufficiently positioned to generate a changing magnetic field in the cavity to inductively charge a battery of the portable electronic device, when the portable electronic device is at least partially within the cavity;
 wireless connectivity hardware configured to establish a wireless connection with the portable electronic device in the cavity; and
 at least one user interface device through which data can be received from or transmitted to the portable electronic device via the wireless connectivity hardware.

11. The media device of claim 10, wherein the structure that defines the cavity includes a member comprising an active material.

12. The media device of claim 11, wherein the active material comprises one of a shape memory alloy and a shape memory polymer.

13. The media device of claim 10, wherein the cavity is a first size in the absence of an activation signal and the cavity is a second size in the presence of an activation signal.

14. The media device of claim 13, wherein the structure comprises a member with a surface configured to support the portable electronic device, wherein the surface is in an elevated position in the absence of the activation signal and the surface is in a depressed position in the presence of the activation signal.

15. The media device of claim 14, wherein the structure further comprises a console for a vehicle when the member is in the depressed position.

16. The vehicle of claim 4, wherein the structure comprises a member and a wall of a console, wherein the member is connected with the wall, wherein the member is in an extended position with respect to the wall in the absence of the activation signal and the member is in a contracted position with respect to the wall in the presence of the activation signal.

17. A method of charging an electronic device comprising:
providing a structure defining a cavity for receiving the electronic device;
detecting the presence of the electronic device at least partially within the cavity;
providing an activation signal in response to detecting the presence of the electronic device;
adjusting the structure to selectively vary the size of the cavity in response to the activation signal; and
providing an inductive charge to the electronic device in response to the activation signal.

18. The method of claim 17, the adjusting the structure further comprising:
defining at least a portion of the cavity with a member; and
moving a member from an elevated position in the absence of the activation signal to a depressed position in the presence of the activation signal.

19. The method of claim 17, the adjusting the structure further comprising:
defining at least a portion of the cavity with a member; and
moving the member from an extended position in the absence of the activation signal to a contracted position in the presence of the activation signal.

* * * * *